Dec. 4, 1956  B. J. McGUIRE  2,772,876
AXLE BRACKET
Filed July 22, 1953

INVENTOR.
Bernard J. McGuire
BY
Atty.

United States Patent Office 2,772,876
Patented Dec. 4, 1956

2,772,876

AXLE BRACKET

Bernard J. McGuire, Chicago, Ill., assignor to American Steel Foundries, Chicago, Ill., a corporation of New Jersey Application July 22, 1953, Serial No. 369,560

8 Claims. (Cl. 267—58)

The invention relates to an axle assembly utilized to support a related vehicle body.

The invention comprehends a main shaft or axle journaled in appropriate bearing brackets, said brackets being secured to the opposite sides of a vehicle body, and means on said axle to rotatably carry a supporting wheel in an eccentric relation to the main shaft. The invention further comprehends the incorporation with said main shaft of a torsional coil spring sleeved over said shaft and having its opposite ends secured, respectively, to the shaft and the bearing bracket whereby vertical motion of the eccentrically carried wheel is resiliently resisted and cushioned.

It is a general object of the invention to imrove the mounting arrangement of the coil spring whereby improved spring action results.

It is a more particular object of the invention to provide positioning and securing lugs on the bearing bracket to properly position and secure the end of the spring associated with the bearing bracket.

It is a further object of the invention to provide a spring shelf extending from the related bearing bracket to support the inside diameter of the related coil and to provide contact between said coil and said positioning lugs so that the contact between the shelf and the spring coil will be maintained at a point approximately 90° from the point of fixation of the spring to the bracket.

It is a further object of the invention to provide a bracket of novel design that can be utilized on either end of the axle assembly thereby precluding the necessity of differently constructed bearing brackets for each side of the assembly.

These and other objects of the invention will become apparent in the course of the following specification and from an examination of the concerned drawings, wherein.

Figure 1:
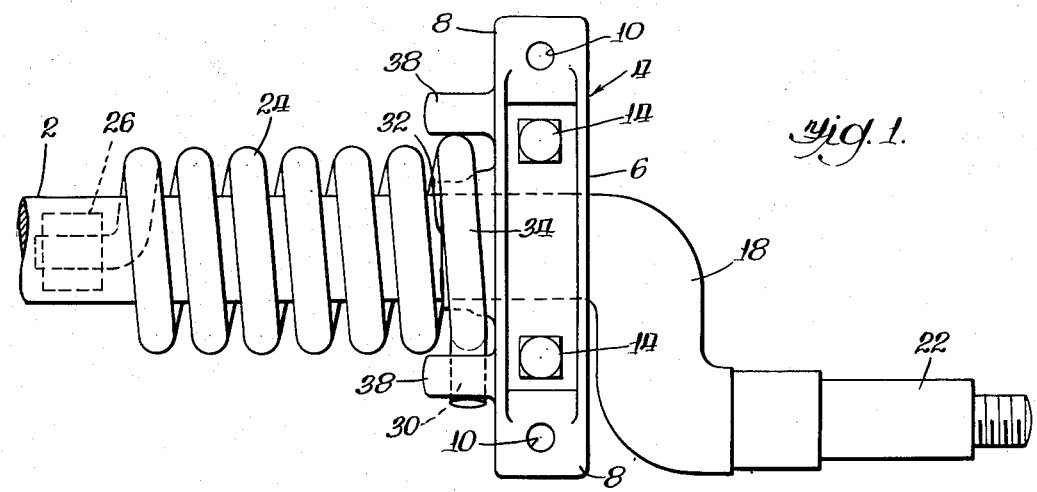
Figure 1 is a plan view of one end of the axle assembly incorporating my invention.
Figure 1A:
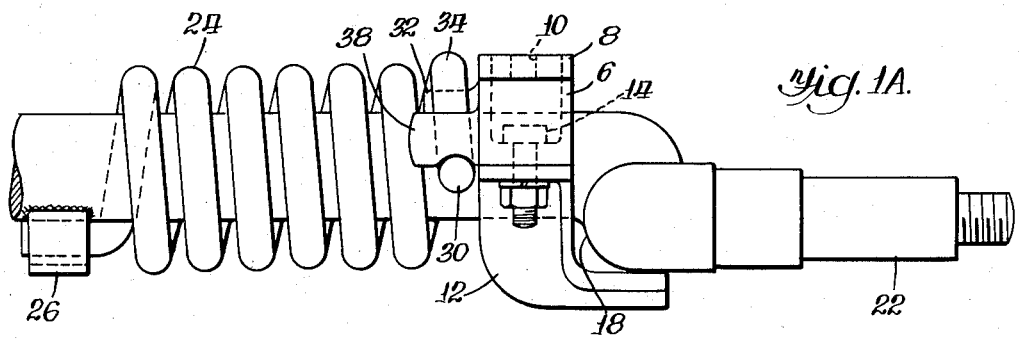
Figure 1A is an elevational view of the axle assembly as shown in Figure 1.

Describing the invention in detail and referring first to Figure 1, it will be noted that said figure illustrates only one end of the axle asembly, inasmuch as the structure shown is duplicated in the other portion of said assembly. The axle asembly comprises a main shaft 2 disposed to extend generally transversely of the associated vehicle body. At each side of the related vehicle body, a bearing bracket, indicated generally at 4 is provided. Said bearing bracket 4 comprises a base 6 having on the opposite ends thereof wings 8, said wings being provided with holes or apertures 10 which serve as a convenient means to mount the base on the associated vehicle body. Additionally, the bracket 4 comprises a cap 12 which is secured by spaced bolts 14 to the underside of the base 8. The base 8 and cap 12 in the assembled position define centrally of the bracket a bushed bearing aperture which journally receives the associated end of the main shaft 2.

Outboardly of the bracket the main shaft 2 is bent to parallel the bracket forming a crank 18, said crank 18 having integrally connected on the end thereof remote from the shaft 2, a conventional spindle 22. As is well understood by those familiar with the art, the spindle 22 provides conventional means for rotatably mounting an associated supporting wheel.

A coil spring indicated generally at 24 is provided and is sleeved over the main axle 2 at a point immediately adjacent the bearing bracket 4. One end of the coil spring is bent to parallel the axis of the main shaft 2 and is secured to said axle by means of a spring clip 26. The opposite end of the spring 24, that is the end of the spring immediately adjacent the bearing bracket, is provided with a hook portion 30 which is formed to extend generally transversely of the axis of the main shaft 2, said hook portion being secured to the bracket in the manner hereinafter described.

Figure 2:
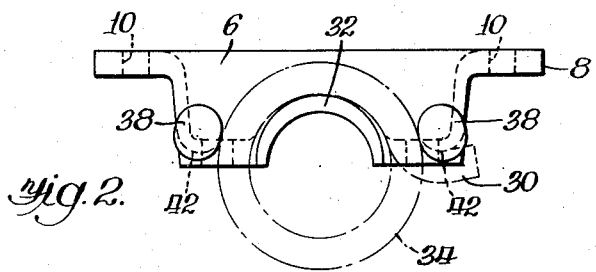
Figure 2 is a side elevational view of the bearing bracket base utilized in my invention.
Figure 4:
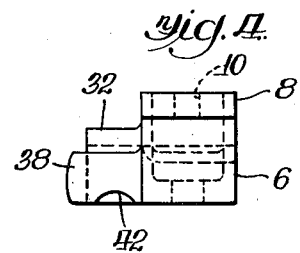
Figure 4 is a front elevational view of the base shown in Figure 2.
Figure 3:
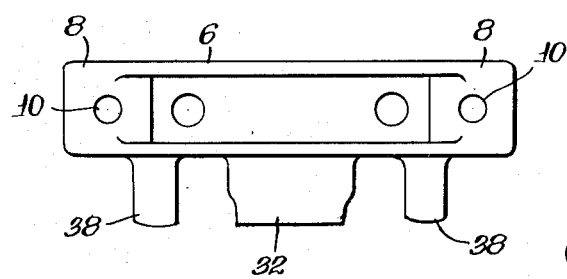
Figure 3 is a plan view of the base shown in Figure 2.

The bearing bracket 4 is additionally provided with a spring shelf or ledge 32 of generally semicylindrical form and disposed to extend or telescope within the adjacent convolution 34 of the coil spring 24. As best seen in Figure 2, the spring shelf 32 is of lesser radius than the radius of the inside diameter of the first adjacent coil 34 with the result that the spring shelf 32 contacts the coil for a short distance only on the periphery of the shelf, instead of continuously abutting the inside diameter of said coil. On each side of the spring 24 the bearing bracket presents positioning lugs 38, 38, said lugs being formed as bosses extending from the inboard face of the associated bearing bracket 4. As will be best seen by referring to Figure 2, the lugs 38, 38 are positioned on the bracket 4 at opposite sides of the first adjacent spring convolution 34 and in such a manner as to abut the outside periphery of said adjacent convolution. In this position, the lugs 38, 38 serve to wedge the adjacent spring end between said lugs and associated spring shelf 32, thus assuring that the inside diameter of the spring convolution 34 will engage the spring shelf 32 at a point approximately 90° from the point of connection between the spring end 30 and the bearing bracket 4. In my preferred embodiment, the spring end 30 is connected to the bearing bracket 4 by means of the hook 30 being attached to one of the positioning lugs 38. Directing attention to Figure 4, it will be seen that the positioning lugs 38 are provided with a cradle or depression 42 on the periphery thereof, said depression serving to receive and position the associated spring end 30.

In operation, the spindle 22 and carried wheel are moved eccentrically about the longitudinal axis of the main shaft 2. This motion of the wheel causes the main shaft 2 to rotate in the journal bearing brackets 4. Rotation of the main shaft 2 is resiliently resisted by the action of the spring 24, that is, the end of the spring secured to the shaft 2 is rotatably carried with the main shaft while the end of the spring secured to the positioning lug 38 of the bearing bracket 4 resists rotation. Consequently, the bending stress or bending moment induced into the spring 24 flexibly and resiliently resists rotation of the spindle 22 and carried wheel. The particular action of the torsion spring is important from the standpoint of an understanding of the invention and it should be noted that the stress induced to the spring 24, while usually denoted torsional, is a substantially pure bending stress. The action is much the same as the stress induced in a straight bar which is secured at one end while the force is applied at the other end. With this in mind, it becomes important to properly support the end of the spring which is fixed against rotation, the proper support being afforded by the spring shelf 32 and lugs 38 of the bracket 4. It has been discovered that the best spring action is obtained when the spring shelf 32 contacts or engages the inside diameter of the related spring and convolution at a point approximately 90° from the point of connection between the spring end and the related bracket. Furthermore, it is desirable to maintain the location of the point of contact between the shelf and spring convolution regardless of the amount of bending stress induced in the associated spring. By providing the positioning lugs 38, 38, which serve the dual purpose of securing the spring end to the bearing bracket end of wedging the adjacent spring convolution between said lugs in the spring shelf, the point of contact between the spring shelf 32 and the spring convolution is maintained substantially at 90° from the point of connection between the spring end and bearing bracket regardless of the amount of stress induced into the spring.

Thus it will be seen that the invention provides novel positioning lugs which serve to fix the associated end of a coil spring to the bearing bracket and which serve the additional purpose of maintaining the spring in proper position to insure maximum spring operation efficiency. The positioning lugs additionally offer the advantage of interchangeability. That is, with the positioning lugs as heretofore described, a given bearing bracket base may be used on either end of the axle assembly.

I claim:

1. In an axle assembly, a bracket, a main shaft journaled for rotation therein, a coil spring surrounding the shaft adjacent the bracket, the end of said spring remote from the bracket being secured to the shaft, a shelf on the bracket telescoping into the first adjacent coil of said spring, a pair of positioning lugs on the bracket, an operative connection between the end of said spring adjacent the bracket and one of said lugs, said lugs engaging the first adjacent coil and operative to maintain contact between said shelf and the first adjacent coil in an area of said first adjacent coil approximately 90° from said operative connection.

2. An axle assembly according to claim 1, wherein said operative connection comprises a straight portion on the end of said spring formed to extend transversely of the axis of the shaft, said straight portion being cradled within a depression formed in said one lug.

3. In an axle assembly, a bracket, a main shaft journaled for rotation therein, a coil spring surrounding the shaft adjacent the bracket, the end of said spring remote from the bracket being secured to the shaft, a shelf on the bracket telescoping into the first adjacent coil of said spring, positioning lugs on the bracket, and an operative connection between the end of said spring adjacent the bracket and the bracket, said lugs engaging the spring and operative to maintain contact between the shelf and the first adjacent coil in a predetermined area on the inside diameter of said first adjacent coil.

4. In an axle assembly for supporting a related vehicle body, a bearing bracket secured to the body, a main shaft having one of its ends journaled for rotation in the bracket, a crank on the shaft outboardly of the bracket, a wheel carrying spindle on said crank, a coil spring on said shaft adjacent said bracket, means securing the inboard end of the spring to the shaft, a spring shelf on said bracket projecting inboardly and telescoped within and engaging the first adjacent coil of the coil spring, a pair of positioning lugs on said bracket disposed on opposite sides of the spring, said lugs engaging the outer periphery of the first adjacent coil, said shelf engaging the inner periphery of said first adjacent coil, and a spring end on said first adjacent coil extending transversely of the shaft in hooked engagement with one of said positioning lugs.

5. An axle assembly according to claim 4, wherein the spring end is of cylindrical cross section, and the positioning lugs each have a depression therein for the cradled reception of the spring end.

6. In an axle assembly, a bearing bracket, a main shaft journaled in the bracket, a coiled spring surrounding the shaft adjacent said bracket, means securing the inboard end of said spring to the shaft, a spring shelf on each bracket projecting into and engaging the inner periphery of the first adjacent coil of the spring, positioning lugs on said bracket straddling and engaging the related first adjacent coil and wedging same between the shelf and the lugs, and a hooked connection between one of said lugs and the end of said first adjacent coil.

7. As an article of manufacture, a bearing base for use in an axle asembly of the type described, said base partially defining a journal opening, lugs fixedly secured to the base on opposite sides of the opening, a spring shelf disposed between and spaced from said lugs, said lugs extending from one side of said base to engage a coil of a spring against said shelf, said base being formed and arranged for use on either end of said axle assembly.

8. In an axle assembly, a bracket comprising a base and a cap defining a bearing aperture, a shaft journaled for rotation in the bracket bearing aperture, a coil spring surrounding the shaft, a connection between one end of the spring and the shaft, spaced lugs on the lugs base extending from one side thereof and straddling one coil of said spring, a hook formed on the end of the spring adjacent the bracket and engaging one of said lugs, and a spring shelf on said bracket base within and engaging said coil spring against said lugs.

References Cited in the file of this patent

UNITED STATES PATENTS

| | | |
|---|---|---|
| 2,023,254 | Stimson | Dec. 3, 1935 |
| 2,068,676 | Hickman | Jan. 26, 1937 |
| 2,426,513 | Linn | Aug. 26, 1947 |
| 2,455,787 | Linn | Dec. 7, 1948 |
| 2,659,596 | Keysor | Nov. 17, 1953 |